United States Patent
Zhang et al.

(10) Patent No.: US 12,514,878 B2
(45) Date of Patent: Jan. 6, 2026

(54) WNT FAMILY MEMBER 4/TYROSINE 3-MONOOXYGENASE/TRYPTOPHAN 5-MONOOXYGENASE ACTIVATION PROTEIN ZETA (WNT4/YWHAZ) CO-MODIFIED MESENCHYMAL STEM CELL (MSC)-DERIVED EXOSOME, AND PREPARATION METHOD AND USE THEREOF

(71) Applicant: Affiliated Hospital of Jining Medical University, Jining (CN)

(72) Inventors: Bin Zhang, Jining (CN); Bo Ban, Jining (CN); Mei Zhang, Jining (CN); Qingli Bie, Jining (CN); Sen Wang, Jining (CN); Haixin Dong, Jining (CN); Jie Wen, Jining (CN); Shushan Han, Jining (CN); Zhi Chen, Jining (CN)

(73) Assignee: Affiliated Hospital of Jining Medical University, Jining (CN)

( * ) Notice: Subject to any disclaimer, the term of this patent is extended or adjusted under 35 U.S.C. 154(b) by 810 days.

(21) Appl. No.: 17/773,944

(22) PCT Filed: May 21, 2020

(86) PCT No.: PCT/CN2020/091517
§ 371 (c)(1),
(2) Date: May 3, 2022

(87) PCT Pub. No.: WO2021/093298
PCT Pub. Date: May 20, 2021

(65) Prior Publication Data
US 2022/0387508 A1 Dec. 8, 2022

(30) Foreign Application Priority Data
Nov. 13, 2019 (CN) .......................... 201911106532.2

(51) Int. Cl.
A61K 35/28 (2015.01)
C07K 14/47 (2006.01)
C12N 5/0775 (2010.01)
C12N 15/86 (2006.01)

(52) U.S. Cl.
CPC .......... *A61K 35/28* (2013.01); *C07K 14/4702* (2013.01); *C12N 5/0662* (2013.01); *C12N 15/86* (2013.01)

(58) Field of Classification Search
None
See application file for complete search history.

(56) References Cited

FOREIGN PATENT DOCUMENTS

| CN | 104490931 A | 4/2015 | |
|---|---|---|---|
| CN | 108251378 A | * 7/2018 | ............ A61K 35/28 |
| CN | 110734896 A | 1/2020 | |

OTHER PUBLICATIONS

WIPO translation of CN 108251378 A (Year: 2018).*
*Homo sapiens* signaling protein WNT-4 mRNA, complete cds (GenBank: AF316543.1) (Year: 2001).*
*Homo sapiens* tyrosine 3-monooxygenase/tryptophan 5-monooxygenase activation protein, zeta polypeptide, mRNA (cDNA clone MGC: 104542 IMAGE:5298373), complete cds (GenBank: BC099904.1) (Year: 2002).*
Genemedi: User Manual of Adenovirus (AdV) (Year: 2018).*
Addison CL, Hitt M, Kunsken D, Graham FL. Comparison of the human versus murine cytomegalovirus immediate early gene promoters for transgene expression by adenoviral vectors. J Gen Virol. Jul. 1997;78 ( Pt 7): 1653-61. doi: 10.1099/0022-1317-78-7-1653. PMID: 9225042. (Year: 1997).*
International Search Report of the International Searching Authority, mailed on Aug. 19, 2020, from International Application No. PCT/CN2020/091517, filed on May 21, 2020. 10 pages.
Written Opinion mailed on Aug. 19, 2020, from International Application No. PCT/CN2020/091517, filed on May 21, 2020. 4 pages.
Zhang, B. et al. "HucMSC Exosome-Delivered 14-3-3~ Orchestrates Self-Control of the Wnt Response via Modulation of YAP During Cutaneous Regeneration," Stem Cells, 34(10): 2485-2500 (2016).
Zhang, B. et al. "HucMSC-Exosome Mediated-Wnt4 Signaling Is Required for Cutaneous Wound Healing," Stem Cells, 33(7): 2158-2168 (2015).
International Preliminary Report on Patentability mailed on May 27, 2022, from International Application No. PCT/CN2020/091517, filed on May 21, 2020. 12 pages.

* cited by examiner

Primary Examiner — Fereydoun G Sajjadi
Assistant Examiner — Qinhua Gu
(74) Attorney, Agent, or Firm — HoustonHogle LLP

(57) ABSTRACT

The present disclosure provides a Wnt family member 4/tyrosine 3-monooxygenase/tryptophan 5-monooxygenase activation protein zeta (Wnt4/YWHAZ) co-modified mesenchymal stem cell (MSC)-derived exosome, and a preparation method and use thereof, belonging to the technical field of skin repair. In the present disclosure, the MSC-derived exosome is modified by overexpressing adenovirus vectors expressing a Wnt4 gene and a YWHAZ gene in the MSCs, such that the exosome overexpresses the Wnt4 gene and the YWHAZ gene, to achieve a medicinal purpose of promoting regeneration and repair of a scalded skin tissue in a rat with the MSC-derived exosome.

20 Claims, 8 Drawing Sheets
Specification includes a Sequence Listing.

WNT FAMILY MEMBER 4/TYROSINE 3-MONOOXYGENASE/TRYPTOPHAN 5-MONOOXYGENASE ACTIVATION PROTEIN ZETA (WNT4/YWHAZ) CO-MODIFIED MESENCHYMAL STEM CELL (MSC)-DERIVED EXOSOME, AND PREPARATION METHOD AND USE THEREOF

RELATED APPLICATIONS

This application is a § 371 National Phase Application of International Application No. PCT/CN2020/091517, filed on May 21, 2020, now International Publication No. WO 2021/093298, published on May 20, 2021, which International Application claims priority to Chinese Patent Application No. 201911106532.2 filed Nov. 13, 2019, both of which are incorporated herein by reference in their entirety.

INCORPORATION BY REFERENCE OF MATERIAL IN ASCII TEXT FILE

This application incorporates by reference the Sequence Listing contained in the following ASCII text file:
File name: 0406-0013US1_SEQ_LIST_GWPCTP20220302040.txt; created Apr. 29, 2022, 4 KB in size.

TECHNICAL FIELD

The present disclosure belongs to the technical field of skin repair, and in particular relates to a Wnt family member 4/tyrosine 3-monooxygenase/tryptophan 5-monooxygenase activation protein zeta (Wnt4/YWHAZ) co-modified mesenchymal stem cell (MSC)-derived exosome, and a preparation method and use thereof.

BACKGROUND ART

Diabetes mellitus (DM), as a lifelong metabolic disease caused by the absolute or relative lack of insulin secretion in the human body, is an important disease affecting human health. Diabetic foot ulcer is one of the most common and major complications of DM, and epidemiological surveys show that about ¼ of diabetic patients may have the diabetic foot ulcer. The diabetic foot ulcer develops neuropathy at the earliest, leads to circulation disorders and sensory disturbances of foot at the later development, and further causes gangrene of the toes or feet, eventually leading to amputation, and even death due to severely systemic infections. Therefore, diabetic skin ulcers have more complex pathogenesis, and are more difficult to heal than other wounds such as burns. Existing treatment methods, such as nerve growth factor combined with local dressing change, still have improper use of antibiotics, and improper wound care and surgical intervention and the like, making the ulcer wound unhealed. Therefore, there is still a need for more efficient solutions.

Exosome, an insoluble microvesicle structure, is an important pathway for intercellular signal communication discovered in recent years, and is an important paracrine form in addition to cell-soluble cytokines. The exosome has the following main properties: (1) a diameter of 40 nm to 100 nm; (2) possessing cytoplasmic and cell membrane lipid components of its source cells; (3) a density of 1.13 g/ml to 1.19 g/ml; (4) containing specific proteins of its source cells, and exosome-related proteins such as CD9, CD81, and Alix.

The exosome has components mainly including: microRNAs, mRNAs, mtDNAs, proteins, and surface markers; the proteomic analysis has found that the exosomes has a relatively complex protein composition, and the protein composition varies in exosomes from different cell sources.

Microvesicles secreted by MSCs (MSC-exosomes) are the most active components in paracrine effects. It has been reported that the MSC-exosomes play an important role in repairing tissue damages in the heart, liver, kidney, and nervous system. A study has found that exosomes secreted by human bone marrow and umbilical cord MSCs from different sources have been successfully isolated and purified, and the exosomes can promote the regeneration and repair of rat skin burns (Patent CN201410775694.6). However, therapy with untreated human umbilical cord MSC (hucMSC)-exosomes is less effective.

SUMMARY

In view of this, a purpose of the present disclosure is to provide a Wnt4/YWHAZ co-modified MSC-derived exosome, and a preparation method and use thereof. The modified MSC-derived exosome obtained by Wnt4/YWHAZ co-modification has a relatively desirable effect in promoting regeneration and repair of rat scalded skin tissues.

The present disclosure provides a preparation method of a Wnt4/YWHAZ co-modified MSC-derived exosome, including the following steps:
1) constructing an adenovirus overexpressing Wnt4 and an adenovirus overexpressing YWHAZ separately;
2) transfecting MSCs with the adenovirus overexpressing Wnt4 and the adenovirus overexpressing YWHAZ constructed in step 1), and conducting culture; and
3) collecting a supernatant obtained by culturing MSCs overexpressing Wnt4 and YWHAZ, removing floating live cells, and separating and purifying an exosome in the supernatant to obtain the Wnt4/YWHAZ co-modified MSC-derived exosome.

Preferably, in the adenovirus overexpressing Wnt4, an mRNA variant of Wnt4 may have a nucleotide sequence shown in SEQ ID NO: 1;
in the adenovirus overexpressing YWHAZ, an mRNA variant of YWHAZ may have a nucleotide sequence shown in SEQ ID NO: 2; and
in the adenovirus overexpressing Wnt4 and the adenovirus overexpressing YWHAZ, an adenovirus element sequence may be mCMV-MCS-3Flag-SV40-EGFP.

Preferably, in step 2), during the transfecting, the adenovirus overexpressing Wnt4 and the adenovirus overexpressing YWHAZ each may have a virus titer of independently $1 \times 10^8$ PFU/mL to $2 \times 10^8$ PFU/mL.

Preferably, in step 2), before the culture, overexpression of Wnt4 and YWHAZ in transfected MSCs may be analyzed by Western blot, and the MSCs overexpressing Wnt4 and YWHAZ may be selected.

Preferably, in step 2), the culture may be conducted by the following steps:
conducting culture to obtain 3 to 5 passages of the MSCs overexpressing Wnt4 and YWHAZ using a low-glucose Dulbecco's modified eagle medium (DMEM) containing 10% fetal bovine serum (FBS) by volume; when cell fusion reaches 70% to 80%, replacing the DMEM with a serum-free medium and conducting culture for 48 h; and collecting a supernatant.

Preferably, in step 3), the floating live cells may be removed by centrifugation at 700 rpm to 900 rpm for 12 min to 20 min.

Preferably, in step 3), the exosome in the supernatant may be separated and purified by the following steps:
subjecting the supernatant after removing live cells to removing cell debris and organelles, primary ultrafiltration concentration, sucrose density gradient centrifugation, secondary ultrafiltration concentration, and sterilization sequentially; where
the cell debris and the organelles are removed by centrifugation at 2,000×g for 10 min and at 10,000×g for 30 min, respectively;
the primary ultrafiltration concentration and the secondary ultrafiltration concentration each are conducted with a filter membrane of 100 kDa at 1,000×g and 4° C. for 30 min;
the sucrose density gradient centrifugation is conducted at 100,000×g and 4° C. for 3 h using a sucrose/heavy water density cushion with a mass percentage content of 30% as a medium; and
the sterilization is conducted by a filter membrane with a pore size of 0.22 μm.

Preferably, the MSCs may be human umbilical cord MSCs (hucMSCs).

The present disclosure further provides a Wnt4/YWHAZ co-modified MSC-derived exosome prepared by the preparation method.

The present disclosure further provides use of the Wnt4/YWHAZ co-modified MSC-derived exosome in preparation of a drug for promoting regeneration and repair of a skin tissue in a diabetic animal.

The present disclosure further provides a Wnt4/YWHAZ co-modified MSC-derived exosome prepared by the preparation method. In the present disclosure, since MSC-exosome can carry Wnt4 and YWHAZ, after over-expression of Wnt4 and YWHAZ genes in MSCs, the MSC-derived exosome is obtained by separation and extraction. Surface marker proteins of Wnt4/YWHAZ-exosome and Vector-exosome are detected by western blot. The results show that an expression level of Wnt4/YWHAZ protein in the Wnt4/YWHAZ-exosome is significantly higher than that of unmodified control exosome. This indicates that the high-expression modification of Wnt4/YWHAZ protein on hucMSC-exosome is successful and effective, and the Wnt4/YWHAZ-exosome is successfully constructed.

The present disclosure further provides use of the Wnt4/YWHAZ co-modified MSC-derived exosome in preparation of a drug for promoting regeneration and repair of a skin tissue in a diabetic animal. Type 2 diabetes mellitus (T2DM) rat skin deep II-degree burn model is used as a research object, and treated with Wnt4/YWHAZ protein-modified hucMSC-exosome, while PBS is used as a blank control, and a Vector-exosome is used as a control. The gross wound observation photos show that, compared with the control PBS, Wnt4/YWHAZ-exosome and Vector-exosome each can promote the repair of scalded skin, and the wound area of Wnt4/YWHAZ-exosome treatment group is smaller than that of the Vector-exosome, indicating a better therapeutic effect. In terms of hair growth status, the Wnt4/YWHAZ-exosome treatment group has the most hair growth after skin tissue damages, indicating a better effect on promoting the formation of skin tissue appendages after damages.

In addition, the gross wound observation photos also show that compared with the YWHAZ-modified exosome (YWHAZ-exosome) alone, the Wnt4/YWHAZ-exosome treatment group has a smaller wound area, and a better effect in promoting skin epidermis regeneration. This proves that the Wnt4 modification is an important factor for the Wnt4/YWHAZ-exosome to promote skin tissue regeneration. The results of HE staining show that there is no significant difference in epidermal growth between Wnt4-exosome and Wnt4/YWHAZ-exosome treatment groups; however, compared with the Wnt4-exosome treatment group alone, the skin appendages are significantly increased in the Wnt4/YWHAZ-exosome treatment group. This indicates that YWHAZ modification plays an important role in the Wnt4/YWHAZ-exosome for promoting skin stem cell differentiation. The above two results prove that Wnt4/YWHAZ co-modification can better enhance the regeneration and repair effects of MSC-exosome in the treatment of skin tissues.

DETAILED DESCRIPTION OF THE EMBODIMENTS

Figure 1:
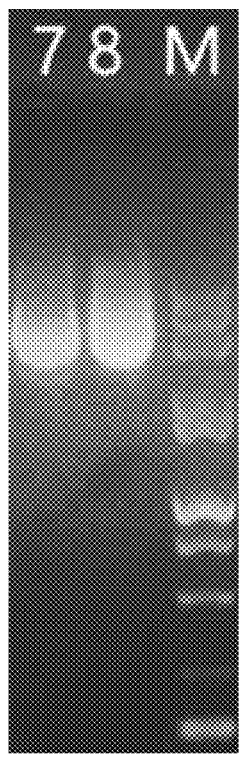
FIG. 1 shows an electrophoretogram of a Wnt4 backbone plasmid, where Marker refers to a DNA Marker (100 bp to 15,000 bp)

The present disclosure provides a preparation method of a Wnt4/YWHAZ co-modified MSC-derived exosome, including the following steps:

1) constructing an adenovirus overexpressing Wnt4 and an adenovirus overexpressing YWHAZ separately;
2) transfecting MSCs with the adenovirus overexpressing Wnt4 and the adenovirus overexpressing YWHAZ constructed in step 1), and conducting culture; and
3) collecting a supernatant obtained by culturing MSCs overexpressing Wnt4 and YWHAZ, removing floating live cells, and separating and purifying an exosome in the supernatant to obtain the Wnt4/YWHAZ co-modified MSC-derived exosome.

In the present disclosure, an adenovirus overexpressing Wnt4 and an adenovirus overexpressing YWHAZ are constructed separately.

Figure 2:
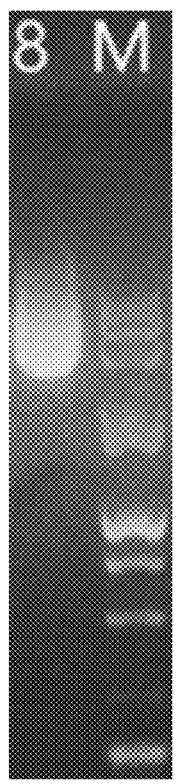
FIG. 2 shows an electrophoretogram of a YWHAZ backbone plasmid, where Marker refers to a DNA Marker (100 bp to 15,000 bp)

In the present disclosure, in the adenovirus overexpressing Wnt4, an mRNA variant of Wnt4 has a nucleotide sequence preferably shown in SEQ ID NO: 1
(NCBI accession number NM_030761.5, atgag tccccgctcg tgcctgcgtt cgctgcgcct cctcgtcttc gccgtcttct cagccgccg gagcaactgg ctgtacctgg ccaagctgtc gtcggtgggg agcatctcag aggaggagac gtgcgagaaa ctcaagggcc tgatccagag gcaggtgcag atgtgcaagc ggaacctgga agtcatggac tcggtgcgcc gcggtgccca gctggccatt gaggagtgcc agtaccagtt ccggaaccgg cgctggaact gctccacact cgactccttg cccgtcttcg gcaaggtggt gacgcaaggg actcgggagg cggccttcgt gtacgccatc tcttcggcag gtgtggcctt tgcagtgacg cgggcgtgca gcagtgggga gctggagaag tgcggctgtg acaggacagt gcatgggggt agcccacagg gcttccagtg gtcaggatgc tctgacaaca tcgcctacgg tgtggccttc tcacagtcgt ttgtggatgt gcgggagaga agcaagggg cctcgtccag cagagccctc atgaacctcc acaacaatga ggccggcagg aaggccatcc tgacacacat ggggtggaa tgcaagtgcc acggggtgtc aggctcctgt gaggtaaaga cgtgctggcg agccgtgccg cccttccgcc aggtgggtca cgcactgaag gagaagtttg atggtgccac tgaggtggag ccacgccgcg tgggctcctc cagggcactg gtgccacgca acgcacagtt caagccgcac acagatgagg acctggtgta cttggagcct agcccgact tctgtgagca ggacatgcgc agcggcgtgc tgggcacgag gggccgcaca tgtgctgtgg ccgcggcttc tgcaaca aga cgtccaaggc catcgacggc tgtgagctgc  cacacggcgc aggtggagct ggctgaacgc tgcagctgca aattccactg gtgtctgcttc gtcaagtgcc ggcagtgcca gcggctcgtg gagttgcaca cgtgccgatg a);

in the adenovirus overexpressing YWHAZ, an mRNA variant of YWHAZ has a nucleotide sequence preferably shown in SEQ ID NO: 2
(NCBI accession number NM_003406.4, atgga taaaaatgag ctggttcaga aggccaaact ggccgagcag gctgagcgat atgatgacat ggcagcctgc atgaagtctg taactgagca aggagctgaa ttatccaatg aggagaggaa tcttctctca gttgcttata aaaatgttgt aggagcccgt aggtcatctt ggagggtcgt ctcaagtatt gaacaaaaga cggaaggtgc tgagaaaaaa cagcagatgg ctcgagaata cagagagaaa attgagacgg agctaagaga tatctgcaat gatgtactgt ctcttttgga aaagttcttg atccccaatg cttcacaagc agagagcaaa gtcttctatt tgaaaatgaa aggagattac taccgttact tggctgaggt tgccgctggt gatgacaaga aagggattgt cgatcagtca caacaagcat accaagaagc ttttgaaatc agcaaaaagg aaatgcaacc aacacatcct atcagactgg gtctggccct taacttctct gtgttctatt atgagattct gaactcccca gagaaagcct gctctcttgc aaagacagct tttgatgaag ccattgctga acttgataca ttaagtgaag agtcatacaa agacagcacg ctaataatgc aattactgag agacaacttg acattgtgga catcggatac ccaaggagac gaagctgaag caggagaagg aggggaaaat taa);

and in the adenovirus overexpressing Wnt4 and the adenovirus overexpressing YWHAZ, an adenovirus element sequence is preferably mCMV-MCS-3Flag-SV40-EGFP, with a vector number of FV012. There is no special limitation on sources of the Wnt4 and YWHAZ genes, and sources of the Wnt4 and YWHAZ genes well known in the art can be used. There is no special limitation on a source of the adenovirus, and the adenovirus can be purchased from commodity approaches well-known in the art. The construction of adenoviruses overexpressing Wnt4 and YWHAZ is the same as that of conventional adenovirus vectors, without special requirements. The basic information on construction of backbone plasmids of Wnt4 and YWHAZ adenovirus vectors is shown in Table 1 and Table 2. The electropherograms of the backbone plasmids of the Wnt4 and YWHAZ adenovirus vectors are shown in FIG. 1 and FIG. 2 in sequence.

TABLE 1

Basic information on construction of Wnt4 backbone plasmid

| Plasmid ID | Plasmid name | Plasmid size | Plasmid volume (μl) | Concentration (ng/μl) | 260/280 | Prokaryotic resistance |
|---|---|---|---|---|---|---|
| FCH-010 | WNT4-3FLAG-OE | 6.2 kb | 40 | 798.2 | 1.89 | Amp+ |

TABLE 2

Basic information on construction of YWHAZ backbone plasmid

| Plasmid ID | Plasmid name | Plasmid size | Plasmid volume (μl) | Concentration (ng/μl) | 260/280 | Prokaryotic resistance |
|---|---|---|---|---|---|---|
| FCH-011 | YWHAZ-3FLAG-OE | 5.9 kb | 40 | 867.8 | 1.90 | Amp+ |

In the present disclosure, MSCs are transfected with the adenovirus overexpressing Wnt4 and the adenovirus overexpressing YWHAZ, and culture is conducted.

Figure 3:
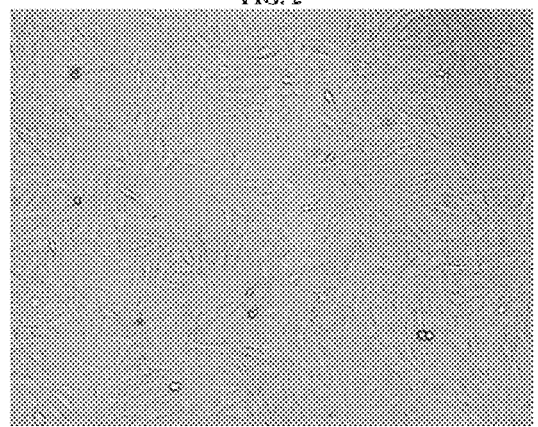
FIG. 3 shows a morphological diagram of umbilical cord mesenchymal stem cells (ucMSCs) isolated and cultured in the present disclosure.

In the present disclosure, the MSCs are preferably hucMSCs. There is no special limitation on a method for separating and culturing the hucMSCs, and methods for separating and culturing well-known in the art can be used; for example, successful isolation, culture and identification of the hucMSCs are conducted using established methods (Qiao Chun et al. Human mesenchymal stem cells isolated from the umbilical cord. *Cell Biol Int.* 2008 January; 32 (1): 8-15). The isolated hucMSCs are cultured in a 37° C., 5% $CO_2$-saturated humidity incubator (FIG. 3).

In the present disclosure, during the transfecting, the adenovirus overexpressing Wnt4 and the adenovirus overexpressing YWHAZ each have a virus titer of independently preferably $1 \times 10^8$ PFU/mL to $2 \times 10^8$ PFU/mL. There is no specific limitation on a method of the transfection, and transfection methods well-known in the art can be used.

Figure 4:
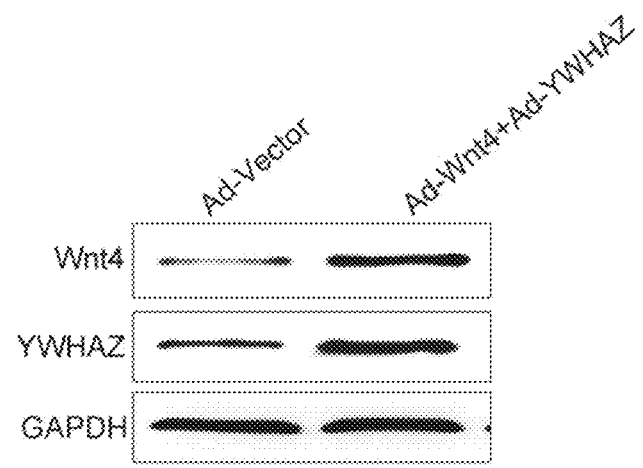
FIG. 4 shows MSCs transfected with a control adenovirus (Ad-Vector) and Wnt4/YWHAZ adenoviruses (Ad-Wnt4+Ad-YWHAZ), where a total protein is extracted, and the expression of Wnt4/YWHAZ is analyzed by Western blot.

In the present disclosure, before the culture, overexpression of Wnt4 and YWHAZ in transfected MSCs is analyzed preferably by Western blot, and the MSCs overexpressing Wnt4 and YWHAZ are selected. The results are shown in FIG. 4. There is no special limitation on the overexpression of Wnt4 and YWHAZ in transfected MSCs analyzed by Western blot, and Western blot technologies well-known in the art can be used.

In the present disclosure, the culture is conducted by preferably the following steps: conducting culture to obtain 3 to 5 passages of the MSCs overexpressing Wnt4 and YWHAZ using a low-glucose Dulbecco's modified eagle medium (DMEM) containing 10% fetal bovine serum (FBS) by volume; when cell fusion reaches 70% to 80%, replacing the DMEM with a serum-free medium and conducting culture for 48 h; and collecting a supernatant. The culture facilitates the Wnt4 and YWHAZ overexpressing in the exosome.

In the present disclosure, a supernatant obtained by culturing MSCs overexpressing Wnt4 and YWHAZ is collected, floating live cells are removed, and an exosome in the supernatant is separated and purified to obtain the Wnt4/YWHAZ co-modified MSC-derived exosome.

In the present disclosure, the floating live cells are removed preferably by centrifugation at preferably 700 rpm to 900 rpm, more preferably 800 rpm for preferably 12 min to 20 min, more preferably 15 min.

In the present disclosure, the exosome in the supernatant is separated and purified by preferably the following steps: subjecting the supernatant after removing live cells to removing cell debris and organelles, primary ultrafiltration concentration, sucrose density gradient centrifugation, secondary ultrafiltration concentration, and sterilization sequentially; where the cell debris and the organelles are removed preferably by centrifugation at preferably 2,000×g for 10 min and at preferably 10,000×g for 30 min, respectively; the primary ultrafiltration concentration and the secondary ultrafiltration concentration each are conducted with a filter membrane of preferably 100 kDa at preferably 1,000×g and 4° C. for preferably 30 min; the sucrose density gradient centrifugation is conducted at preferably 100,000×g and 4° C. for preferably 3 h using preferably a sucrose/heavy water density cushion with a mass percentage content of 30% as a medium; and the sterilization is conducted preferably by a filter membrane with a pore size of preferably 0.22 μm. After separation and purification, protein quantitative detection is conducted preferably using a BCA protein quantitative kit method.

Figure 5:
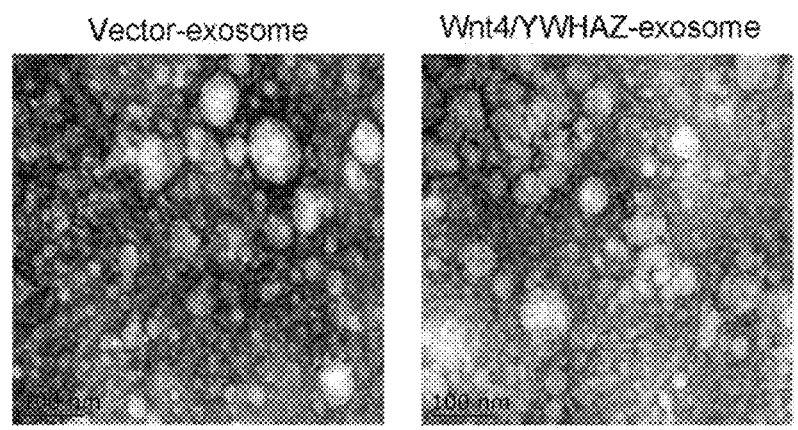
FIG. 5 shows morphologies of the exosomes co-modified with Wnt4 and YWHAZ and a control exosome observed by a transmission electron microscope, where a scale bar is 100 nm.
Figure 6:
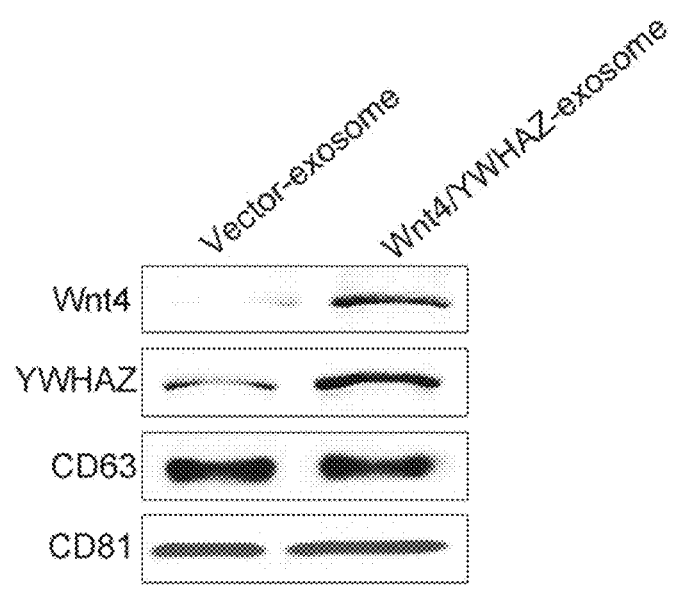
FIG. 6 shows protein expressions of Wnt4 and YWHAZ in the isolated and purified exosome analyzed by Western blot.

The present disclosure further provides a Wnt4/YWHAZ co-modified MSC-derived exosome prepared by the preparation method. A basic morphology of the exosome is observed by a transmission electron microscope, and the results are shown in FIG. 5. The high-expression modification of surface marker proteins of the Wnt4/YWHAZ-exosome and the Vector-exosome, and the Wnt4/YWHAZ protein are detected by western blot, and the results are shown in FIG. 6.

The present disclosure further provides use of the Wnt4/YWHAZ co-modified MSC-derived exosome in preparation of a drug for promoting regeneration and repair of a skin tissue in a diabetic animal.

In the present disclosure, the drug is preferably an injection. In the injection, the Wnt4/YWHAZ co-modified MSC-derived exosomes has a concentration of 1 g/mL. The Wnt4/YWHAZ co-modified MSC-derived exosome has an injection amount of 200 μg/rat.

The Wnt4/YWHAZ co-modified MSC-derived exosome, and the preparation method and the use thereof provided by the present disclosure will be described in detail below with reference to examples, but they cannot be understood as limiting the claimed scope of the present disclosure.

Explanation of Terms

Wnt4 (Wnt family member 4); YWHAZ (tyrosine 3-monooxygenase/tryptophan 5-monooxygenase activation protein zeta); hucMSC (human umbilical cord mesenchymal stem cells); exosome; PBS (phosphate-buffered saline); Vector-exosome (a control empty adenovirus-transfected exosome); Wnt4/YWHAZ-exosome (a Wnt4 and YWHAZ-overexpressing adenovirus-transfected exosome); Ad-VECTOR (a control empty adenovirus vector); Ad-Wnt4 (a Wnt4-overexpressed adenovirus vector); Ad-YWHAZ (a YWHAZ-overexpressed adenovirus vector).

Example 1

Main materials and sources were as follows:

MSC culture reagents: low-sugar Dulbecco's Modified Eagle Medium (DMEM), fetal bovine serum (FBS) (Gibco), trypsin (Sigma), carbon dioxide incubator (Forma), and serum-free medium (Shanghai ExCell Bio);

Transfection reagent: Lipo2000 (Lifetechnology, US)

Inverted microscope, fluorescence microscope, biological microscope, electron microscope, clean bench, and desk centrifuge;

Wnt4 overexpressing adenovirus vector and YWHAZ overexpressing adenovirus vector (Suzhou Future Biotherapeutics Co., Ltd.);

Reagents for preparation of Wnt4 and YWHAZ-modified exosome: heavy water ($D_2O$, Shanghai Chuangsai Scientific Instrument Co., Ltd.), analytically pure sucrose (Guangzhou Chemical Reagent Factory), FBS (Gibico), rabbit anti-human CD81 antibody (Bioworld Technology, US), rabbit anti-human CD63 antibody (Epitomics, US), BCA Protein Assay Kit, horseradish peroxidase (HRP)-conjugated goat anti-rabbit IgG secondary antibody (Beijing Cowin Biotech Co., Ltd.), chemiluminescent HRP substrate, 100-kDa MWCO ultrafiltration centrifuge tube, 0.22 μm sterile filter membrane (Millipore, US); Transmission Electron Microscope (FEI Tecnai 12, Philips); and quantitative PCR reagents (Cwbio, Beijing).

Specific implementation steps of Example 1 were as follows:

(1) Isolation and culture of umbilical cord MSCs: successful isolation, culture and identification of the hucMSCs were conducted using established methods (Qiao Chun et al. Human mesenchymal stem cells isolated from the umbilical cord. *Cell Biol Int.* 2008 January; 32 (1): 8-15); the isolated hucMSCs were cultured in a 37° C., 5% $CO_2$-saturated humidity incubator, as shown in FIG. 3.

(2) Transfection of MSCs with Wnt4 and YWHAZ overexpressing adenoviruses and its control virus at a virus titer of about $10^8$; the protein expression of Wnt4 and YWHAZ was analyzed by Western blot after transfection of hucMSCs by adenovirus, to prove whether the Wnt4 and YWHAZ were successfully overexpressed in the hucMSCs (FIG. 4).

(3) A supernatant of hucMSCs after culture (hucMSC-CM) was collected after Wnt4 and YWHAZ overexpression: hucMSCs transfected with adenovirus overexpressing Wnt4 and YWHAZ were selected at passages 3 to 5 in desirable growth conditions, cultured in a low-glucose DMEM containing 10% FBS; when cell fusion reached 70% to 80%, the DMEM was replaced with a serum-free medium and culture was conducted for 48 h; and a supernatant was collected, centrifuged at 800 rpm for 15 min to remove floating live cells, and stored at a −70° C. refrigerator for later use.

(4) Separation and purification of an exosome in a hucMSC secreted supernatant (hucMSC-CM) of a Wnt4 and YWHAZ protein-modified exosome (Wnt4/YWHAZ-exosome) (using sucrose density gradient centrifugation, which had been Patent protection, and was not described herein): the collected hucMSC supernatant was centrifuged at 4° C. and 2,000×g for 10 min to remove cell debris; after collecting a supernatant, centrifugation was conducted at 10,000×g for 30 min at 4° C. to remove organelles; the supernatant was transferred to a 100-kDa MWCO ultrafiltration centrifuge tube, and centrifuged at 4° C., 1,000×g for 30 min for concentration; a concentrate was slowly transferred to 5 ml of a 30% sucrose/heavy water density cushion ($\rho$=1.210 $g/cm^3$), and centrifuged at 100,000×g for 3 h at 4° C.; 5 ml of a sucrose/heavy water layer (containing exosome) was collected at the bottom, diluted with PBS, added to the 100-kDa MWCO ultrafiltration centrifuge tube, centrifuged at 4° C., 1 000×g for 30 min, and washed 3 times with the PBS; filtration was conducted with a 0.22 μm sterile filter membrane for sterilization, and the obtained exosome was stored at −70° C. after aliquoting; and protein quantitative detection was conducted using a BCA protein quantitative kit.

(5) The basic morphology of exosome was observed by transmission electron microscope: 20 μL for each of two hucMSC-Ex were mixed well, added dropwise onto a 2 mm copper mesh by diameter, and allowed to stand at room temperature for 5 min; residual liquid on an edge of the copper mesh was gently absorbed by a filter paper, the copper mesh was placed upside down on a drop of 30 g/L phosphotungstic acid (pH=6.8), and negative staining was conducted for 5 min at room temperature; and the copper mesh was dried under an incandescent lamp, observed and photographed under a transmission electron microscope. As shown in FIG. 5, the exosome modified by Wnt4/YWHAZ expression (Wnt4/YWHAZ-exosome) and its control exosome (Vector-exosome) have vesicle-like structures with a diameter of about 100 nm.

(6) Western blot detection of surface marker proteins of Wnt4/YWHAZ-exosome and Vector-exosome: a 15% SDS-PAGE electrophoresis gel was prepared, the exosome extracted above was fully lysed, and ¼ volume of a 5×SDS loading buffer was added, boiled for 5 min, and loaded according to 200 μg of a total protein; the protein was transferred to a PVDF membrane by electrotransfer (350 mA, 120 min), blocked with TBS/T containing 50 g/L nonfat milk for 1 h at room temperature, and reacted with a rabbit anti-human CD9 antibody and a rabbit anti-human CD81 antibody (1:500) separately at 4° C. overnight; on a next day, the membrane was washed three times with TBS/0.5% Tween 20, and incubated with HRP-labeled goat anti-rabbit IgG secondary antibody at 37° C. for 1 h; after washing the membrane three times with the TBS/0.5% Tween 20, a premixed chemiluminescent HRP substrate was added, and detection was conducted by a chemiluminescence gel imaging system. The results are shown in FIG. 2B, the marker proteins CD81 and CD63 of umbilical cord-derived exosome are positively expressed; meanwhile, it can be found that the expression of Wnt4/YWHAZ protein in the Wnt4/YWHAZ-exosome is significantly higher than that of the unmodified control exosome. This proves that the high-expression modification of Wnt4/YWHAZ protein on the hucMSC-exosome is successful and effective, and the Wnt4/YWHAZ-exosome is successfully constructed (FIG. 6).

Example 2

Experimental Animal Sources and Reagents

SD rats (Animal Experiment Center, Jining Medical University, this experiment was approved by the Ethics Committee of the Affiliated Hospital of Jining Medical University);

a small animal scalding device invented by a research group (authorized patent number: 201420060187. X);

an immunohistochemical staining reagent (Wuhan Boster Biological Technology Co., Ltd., operation was conducted according to the kit instructions);

a 24-well culture plate, a 6-well culture plate (Corning, US); Roche portable glucometer (active type);

HACAT cells (purchased from Shanghai Chinese Academy of Sciences);

a PCNA antibody (Bioworld, US); and a biological microscope (Nikon, Japan), an experimental platform for HE staining of pathological sections and PCNA histochemical staining (Leica, Germany).

Specifically:

(1) Construction of a skin deep II-degree scald model of T2DM rats: male SD rats of about 200 g were fed with 45% high-fat diet for 5 weeks; tail vein injection of streptozotocin (STZ) (35 mg/kg, Sigma) was conducted; after 7 d, whether a blood glucose was >16.7 mmol/L was detected by a Roche portable glucometer (active type), and glucose tolerance was detected by oral glucose tolerance test (OGTT), intraperitoneal insulin tolerance test (IPITT) and other experiments to assist in diagnosing whether the model was successfully constructed (a standard of hyperglycemia in rats was 16.7 mmol/L); the back of T2DM rat was depilated with 8% $Na_2S$; on a next day, a self-made scalding device was used to injure the back at 80° C. for 8 sec, to create a circular deep II-degree scald wound with a diameter of 1.5 cm.

(2) Use of Wnt4/YWHAZ protein-modified hucMSC-exosome (Wnt4/YWHAZ-exosome): each rat was injected into a subcutaneous tissue of the wound with Wnt4/YWHAZ-exosome with a protein content of 200 μg and dissolved in 200 μl of the PBS and its control exosome (original exosome, referring to a granted patent 201410775694.6, named "USE OF EXOSOME SECRETED BY HUMAN UMBILICAL CORD MESENCHYMAL STEM CELLS IN TREATING SKIN DAMAGE") for treatment, with PBS as a blank control; where the observation time of repairing effect was 5 d and 10 d after scald treatment.

Figure 7:
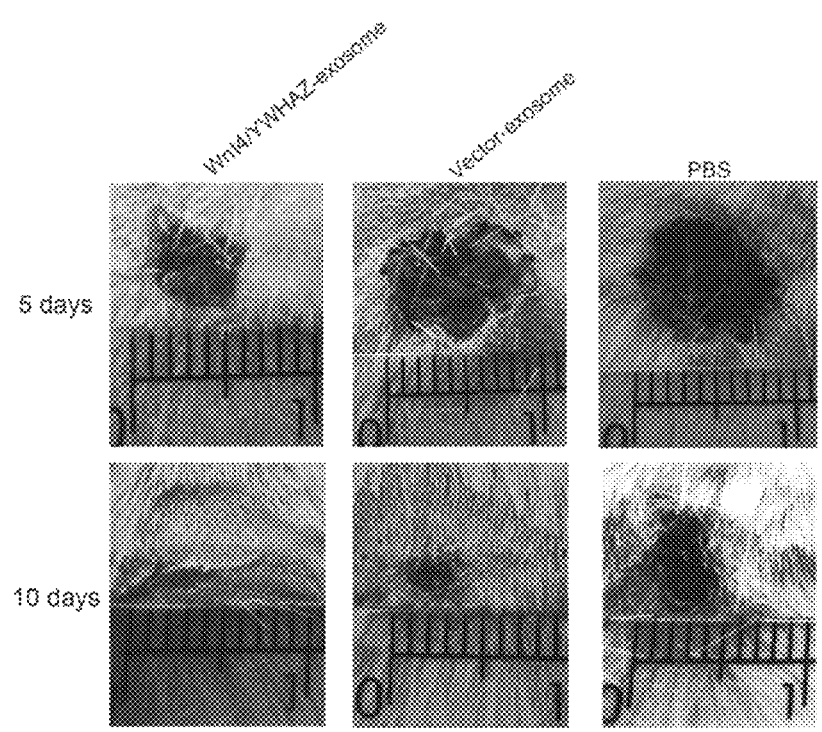
FIG. 7 shows gross wound images of a deep-scalded rat treated with the Wnt4/YWHAZ co-modified exosome and the control exosome.

As shown in FIG. 7, the gross wound observation photos show that compared with the control PBS, Wnt4/YWHAZ-exosome and control Vector-exosome each can promote the repair of scalded skin, and the wound area of Wnt4/YWHAZ-exosome treatment group is smaller than that of the control Vector-exosome, indicating a better therapeutic effect. In terms of hair growth status, the Wnt4/YWHAZ-exosome treatment group has the most hair growth after skin tissue damages, indicating a better effect on promoting the formation of skin tissue appendages after damages.

Figure 8:
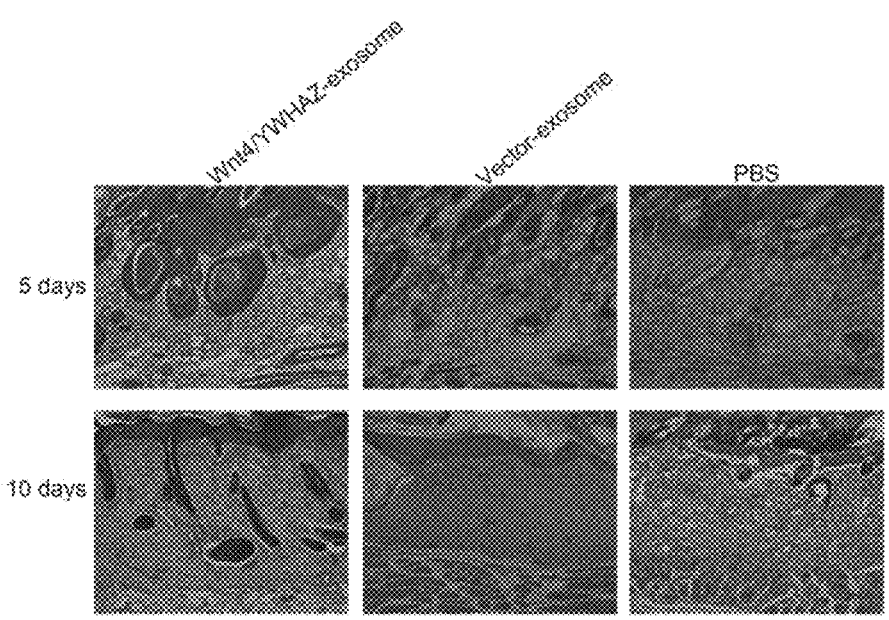
FIG. 8 shows photographs of wound tissues after pathological HE staining of the deep-scalded rat treated with the Wnt4/YWHAZ co-modified exosome and the control exosome.

The observation of skin histopathological sections after HE staining shows that, compared with the negative control of PBS, Wnt4/YWHAZ-exosome and control exosome each can promote epidermal regeneration of scalded skin, and the Wnt4/YWHAZ-exosome treatment group shows the most active proliferation of skin tissue cells and the most obvious degree of epidermal regeneration; this indicates that Wnt4/YWHAZ protein-modified exosome (Wnt4/YWHAZ-exosome) has better therapeutic effects compared to the original exosome (unengineered exosome), as shown in FIG. 8. From the skin tissue structure after HE staining, it can be seen that compared with the original exosome (exosome), in the skin tissue of the Wnt4/YWHAZ-exosome treatment group, hair follicles, sebaceous glands and other accessory structures are significantly increased; this proves that Wnt4/YWHAZ-exosome has a better therapeutic effect, as shown in FIG. 8.

Figure 9:
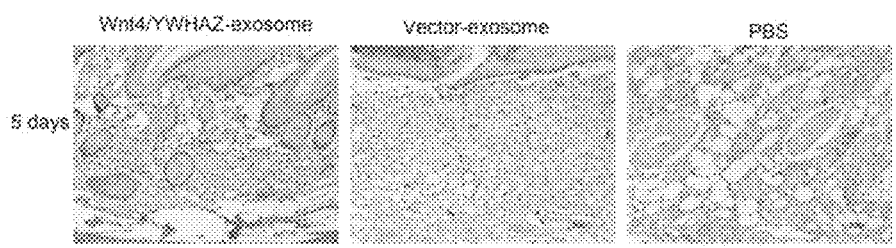
FIG. 9 shows immunohistochemical staining results of proliferating cell nuclear antigen (PCNA) in wound tissues of the deep-scalded rat treated with the Wnt4/YWHAZ co-modified exosome and the control exosome.

Histochemical staining of PCNA, a cell proliferation indicator, was conducted on the skin tissues of the treatment group and the control group. The results show that the positive rate of PCNA in the skin tissues of the Wnt4/YWHAZ-exosome treatment group is significantly higher than that of the unmodified exosome (FIG. 9).

Therefore, compared with the original patent (authorized No. 201410775694.6), the Wnt4/YWHAZ protein-modified hucMSC-exosome has a better effect on promoting the repair of deep scald in rats.

Example 3

Experimental equipment:
HACAT cells were purchased from ATCC.
An inverted microscope (Nikon, Japan), an ultra-clean workbench (domestic), a desktop centrifuge (Thermo, US).
The specific experimental steps were as follows:
(1) An effect of different modification methods on cell growth was verified by cytometry, specifically: 5,000 HACAT cells were inoculated in a 24-well plate, stimulated with Wnt4/YWHAZ-exosome or Vector-exosome the next day, and the number of cells per well were counted every day, for 3 consecutive days.

Figure 10:
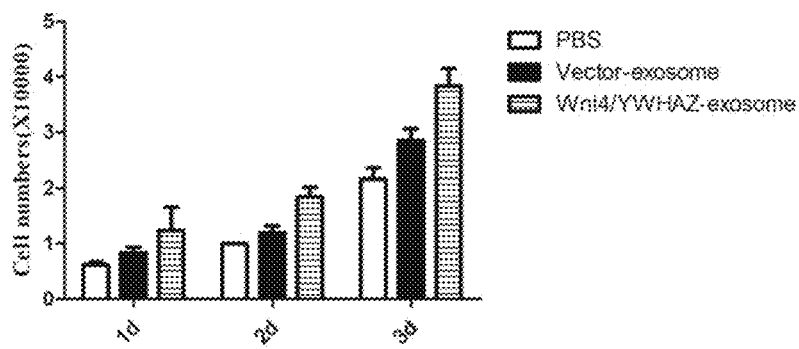
FIG. 10 shows results of a proliferation effect of the Wnt4/YWHAZ-exosome and the control Vector-exosome on skin keratinocyte HACAT cells analyzed by cytometry.

The results show that Wnt4/YWHAZ-exosome and Vector-exosome each can promote the increase of HaCAT cells in skin cells in vitro, which is consistent with the results of skin tissue in SD rats; and in the Wnt4/YWHAZ-exosome treatment group, the HACAT cells grow faster, which significantly better than that in the Vector-exosome group (FIG. 10).

(2) An effect of different modified exosomes on cell migration were analyzed by cell scratch assay: $10^6$ HACAT cells were inoculated into a 6-well plate, scratched with a 10 μm pipette tip, added with Wnt4/YWHAZ-exosome or Vector-exosome for stimulation, followed by taking pictures 24 h later to observe a rate of cell migration to the scratched area.

Figure 11:
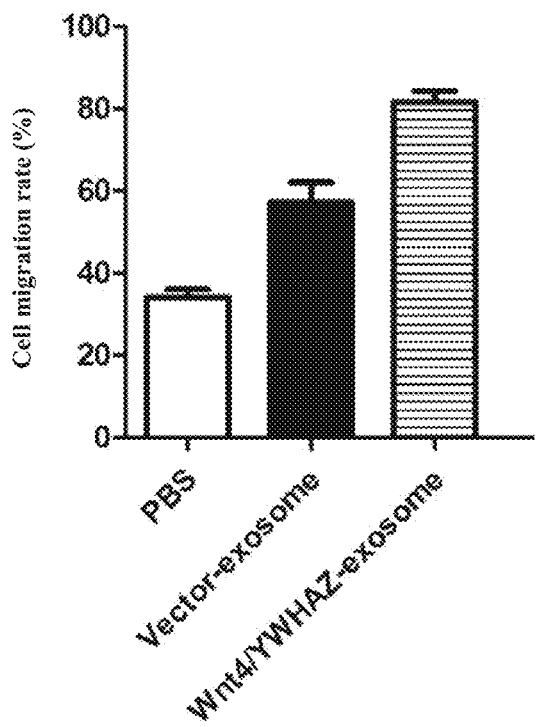
FIG. 11 shows results of a migration effect of the Wnt4/YWHAZ-exosome and the control Vector-exosome on skin keratinocyte HACAT cells analyzed by scratch assay.

The results show that the cell migration ability of HACAT cells treated with Wnt4/YWHAZ-exosome is significantly increased compared to that of the Vector-exosome control (FIG. 11).

Therefore, compared with Vector-exosome, Wnt4/YWHAZ-exosome has a stronger ability to promote skin cell proliferation and migration to wound surface.

Comparative Example 1

A Wnt4-overexpressing exosome (Wnt4-exosome) was constructed according to the method of Example 1, except that hucMSCs were transfected with only the Wnt4-overexpressing adenovirus, and there were no differences in other steps.

Comparative Example 2

An YWHAZ-overexpressing exosome (YWHAZ-exosome) was constructed according to the method of Example 1, except that hucMSCs were transfected with only the YWHAZ-overexpressing adenovirus, and there were no differences in other steps.

Example 4

Use of Wnt4/YWHAZ protein-modified hucMSC-exosome (Wnt4/YWHAZ-exosome): each rat was injected into a subcutaneous tissue of the wound with Wnt4/YWHAZ-exosome with a protein content of 200 μg and dissolved in 200 μl of the PBS and its control Vector-exosome for treatment, with an exosome modified with YWHAZ alone and an exosome modified with Wnt4 alone as blank controls; where the observation time of repairing effect was 5 d and 10 d after scald treatment.

Figure 12:
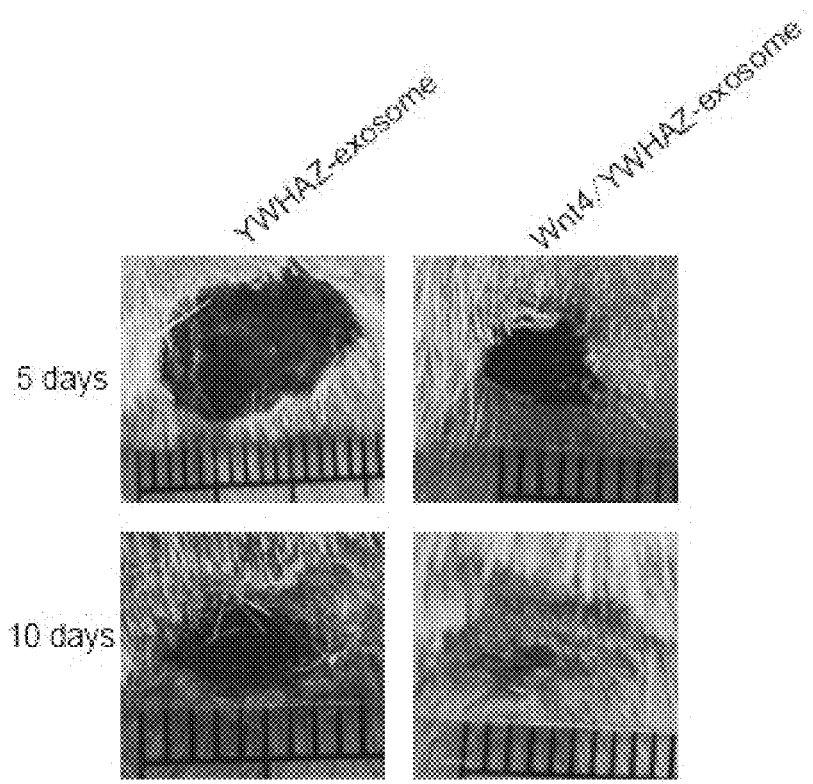
FIG. 12 shows gross wound images of the deep-scalded rat treated with the Wnt4/YWHAZ-exosome and the YWHAZ-exosome.

A result was as follows:
(1) the gross wound observation photos also show that compared with the YWHAZ-modified exosome (YWHAZ-exosome) alone, the Wnt4/YWHAZ-exosome treatment group has a smaller wound area, and a better effect in promoting skin epidermis regeneration. This proves that the Wnt4 modification is an important factor for the Wnt4/YWHAZ-exosome to promote skin tissue regeneration (FIG. 12).

Figure 13:
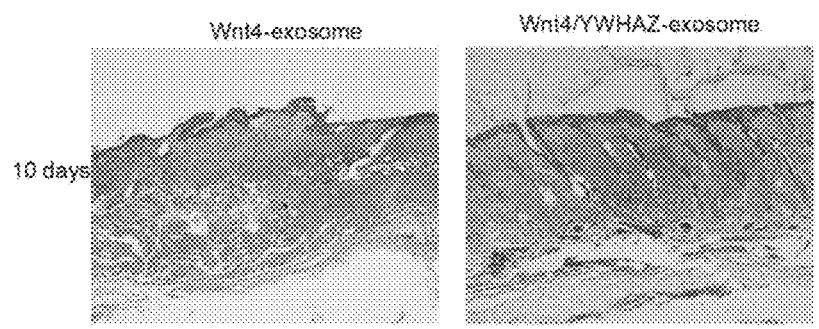
FIG. 13 shows HE photographs of the skin tissue of the deep-scalded rat treated with the Wnt4/YWHAZ-exosome and the Wnt4-exosome.

(2) The results of HE staining show that there is no significant difference in epidermal growth between Wnt4-exosome and Wnt4/YWHAZ-exosome treatment groups; however, compared with the Wnt4-exosome treatment group alone, the skin appendages are significantly increased in the Wnt4/YWHAZ-exosome treatment group. This indicates that YWHAZ modification plays an important role in the Wnt4/YWHAZ-exosome for promoting skin stem cell differentiation (FIG. 13). The above two results prove that Wnt4/YWHAZ co-modification can better enhance the regeneration and repair effects of MSC-exosome in the treatment of skin tissues.

Compared with the Wnt4-modified exosome alone or the YWHAZ-modified exosome alone (Wnt4-exosome or YWHAZ-exosome), the Wnt4/YWHAZ-exosome has a better repair effect.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

The above description of examples is merely provided to help illustrate the method of the present disclosure and a core idea thereof. It should be noted that several improvements and modifications may be made by persons of ordinary skill in the art without departing from the principle of the present disclosure, and these improvements and modifications should also fall within the protection scope of the present disclosure. Various amendments to these embodiments are apparent to those of professional skill in the art, and the general principles defined herein may be implemented in other embodiments without departing from the spirit or scope of the present disclosure. Thus, the present disclosure is not limited to the examples shown herein but falls within the widest scope consistent with the principles and novel features disclosed herein.

What is claimed is:

1. A preparation method of a Wnt family member 4/tyrosine 3-monooxygenase/tryptophan 5-monooxygenase activation protein zeta (Wnt4/YWHAZ) co-modified mesenchymal stem cell (MSC)-derived exosome, comprising the following steps:
   1) constructing an adenovirus overexpressing Wnt4 and an adenovirus overexpressing YWHAZ separately;
   2) transfecting MSCs with the adenovirus overexpressing Wnt4 and the adenovirus overexpressing YWHAZ constructed in step 1), and culturing the transfected MSCs; and
   3) collecting a supernatant obtained by culturing MSCs overexpressing Wnt4 and YWHAZ, removing floating live cells, and separating and purifying an exosome in the supernatant to obtain the Wnt4/YWHAZ co-modified MSC-derived exosome.

2. The preparation method according to claim 1, wherein in the adenovirus overexpressing Wnt4, an mRNA variant of Wnt4 comprising a nucleotide sequence shown in SEQ ID NO: 1;
   in the adenovirus overexpressing YWHAZ, an mRNA variant of YWHAZ comprising a nucleotide sequence shown in SEQ ID NO: 2; and
   in the adenovirus overexpressing Wnt4 and the adenovirus overexpressing YWHAZ, an adenovirus element sequence is mCMV-MCS-3Flag-SV40-EGFP.

3. The preparation method according to claim 1, wherein in step 2), during the transfecting, the adenovirus overexpressing Wnt4 and the adenovirus overexpressing YWHAZ each have a virus titer of independently $1\times10^8$ plaque forming unit (PFU)/mL to $2\times10^8$ plaque forming unit (PFU)/mL.

4. The preparation method according to claim 1, wherein in step 2), before the culturing the transfected MSCs, overexpression of Wnt4 and YWHAZ in transfected MSCs is analyzed by Western blot, and the MSCs overexpressing Wnt4 and YWHAZ are selected.

5. The preparation method according to claim 1, wherein in step 2), the culturing the transfected MSCs is conducted by the following steps:
   culturing the transfected MSCs to obtain 3 to 5 passages of the MSCs overexpressing Wnt4 and YWHAZ using a low-glucose Dulbecco's modified eagle medium (DMEM) containing 10% fetal bovine serum (FBS) by volume; when cell fusion reaches 70% to 80%, replacing the DMEM with a serum-free medium and culturing the transfected MSCs in the serum-free medium for 48 h; and collecting a supernatant.

6. The preparation method according to claim 1, wherein in step 3), the floating live cells are removed by centrifugation at 700 rpm to 900 rpm for 12 min to 20 min.

7. The preparation method according to claim 1, wherein in step 3), the exosome in the supernatant is separated and purified by the following steps:
   subjecting the supernatant after removing live cells to removing cell debris and organelles, primary ultrafiltration concentration, sucrose density gradient centrifugation, secondary ultrafiltration concentration, and sterilization sequentially; wherein
   the cell debris and the organelles are removed by centrifugation at $2,000\times g$ for 10 min and at $10,000\times g$ for 30 min, respectively;
   the primary ultrafiltration concentration and the secondary ultrafiltration concentration each are conducted with a filter membrane of 100 kDa at $1,000\times g$ and 4° C. for 30 min;
   the sucrose density gradient centrifugation is conducted at $100,000\times g$ and 4° C. for 3 h using a sucrose/heavy water density cushion with a mass percentage content of 30% as a medium; and
   the sterilization is conducted by a filter membrane with a pore size of 0.22 μm.

8. The preparation method according to claim 1, wherein the MSCs are human umbilical cord MSCs (hucMSCs).

9. The preparation method according to claim 8, wherein in the adenovirus overexpressing Wnt4, an mRNA variant of Wnt4 comprising a nucleotide sequence shown in SEQ ID NO: 1;
in the adenovirus overexpressing YWHAZ, an mRNA variant of YWHAZ comprising a nucleotide sequence shown in SEQ ID NO: 2; and
in the adenovirus overexpressing Wnt4 and the adenovirus overexpressing YWHAZ, an adenovirus element sequence is mCMV-MCS-3Flag-SV40-EGFP.

10. The preparation method according to claim 8, wherein in step 2), during the transfecting, the adenovirus overexpressing Wnt4 and the adenovirus overexpressing YWHAZ each have a virus titer of independently $1 \times 10^8$ PFU/mL to $2 \times 10^8$ PFU/mL.

11. The preparation method according to claim 8, wherein in step 2), before the culturing the transfected MSCs, overexpression of Wnt4 and YWHAZ in transfected MSCs is analyzed by Western blot, and the MSCs overexpressing Wnt4 and YWHAZ are selected.

12. The preparation method according to claim 8, wherein in step 2), the culturing the transfected MSCs is conducted by the following steps:
culturing the transfected MSCs to obtain 3 to 5 passages of the MSCs overexpressing Wnt4 and YWHAZ using a low-glucose Dulbecco's modified eagle medium (DMEM) containing 10% fetal bovine serum (FBS) by volume; when cell fusion reaches 70% to 80%, replacing the DMEM with a serum-free medium and culturing the transfected MSCs in the serum-free medium for 48 h; and collecting a supernatant.

13. The preparation method according to claim 8, wherein in step 3), the floating live cells are removed by centrifugation at 700 rpm to 900 rpm for 12 min to 20 min.

14. The preparation method according to claim 8, wherein in step 3), the exosome in the supernatant is separated and purified by the following steps:
subjecting the supernatant after removing live cells to removing cell debris and organelles, primary ultrafiltration concentration, sucrose density gradient centrifugation, secondary ultrafiltration concentration, and sterilization sequentially; wherein
the cell debris and the organelles are removed by centrifugation at 2,000×g for 10 min and at 10,000×g for 30 min, respectively;
the primary ultrafiltration concentration and the secondary ultrafiltration concentration each are conducted with a filter membrane of 100 kDa at 1,000×g and 4° C. for 30 min;
the sucrose density gradient centrifugation is conducted at 100,000×g and 4° C. for 3 h using a sucrose/heavy water density cushion with a mass percentage content of 30% as a medium; and
the sterilization is conducted by a filter membrane with a pore size of 0.22 μm.

15. The Wnt4/YWHAZ co-modified MSC-derived exosome according to claim 13, wherein in the adenovirus overexpressing Wnt4, an mRNA variant of Wnt4 comprising a nucleotide sequence shown in SEQ ID NO: 1;
in the adenovirus overexpressing YWHAZ, an mRNA variant of YWHAZ comprising a nucleotide sequence shown in SEQ ID NO: 2; and
in the adenovirus overexpressing Wnt4 and the adenovirus overexpressing YWHAZ, an adenovirus element sequence is mCMV-MCS-3Flag-SV40-EGFP.

16. The Wnt4/YWHAZ co-modified MSC-derived exosome according to claim 13, wherein in step 2), during the transfecting, the adenovirus overexpressing Wnt4 and the adenovirus overexpressing YWHAZ each have a virus titer of independently $1 \times 10^8$ PFU/mL to $2 \times 10^8$ PFU/mL.

17. The Wnt4/YWHAZ co-modified MSC-derived exosome according to claim 13, wherein in step 2), before the culturing the transfected MSCs, overexpression of Wnt4 and YWHAZ in transfected MSCs is analyzed by Western blot, and the MSCs overexpressing Wnt4 and YWHAZ are selected.

18. The Wnt4/YWHAZ co-modified MSC-derived exosome according to claim 13, wherein in step 2), the culturing the transfected MSCs is conducted by the following steps:
culturing the transfected MSCs to obtain 3 to 5 passages of the MSCs overexpressing Wnt4 and YWHAZ using a low-glucose Dulbecco's modified eagle medium (DMEM) containing 10% fetal bovine serum (FBS) by volume; when cell fusion reaches 70% to 80%, replacing the DMEM with a serum-free medium and culturing the transfected MSCs in the serum-free medium for 48 h; and collecting a supernatant.

19. A Wnt4/YWHAZ co-modified MSC-derived exosome prepared by the preparation method according to claim 1.

20. Use of the Wnt4/YWHAZ co-modified MSC-derived exosome according to claim 19 in preparation of a drug for promoting regeneration and repair of a skin tissue in a diabetic animal.

\* \* \* \* \*

SEQUENCE LISTING

<160> NUMBER OF SEQ ID NOS: 2

<210> SEQ ID NO 1
<211> LENGTH: 1055
<212> TYPE: DNA
<213> ORGANISM: Artificial Sequence
<220> FEATURE:
<223> OTHER INFORMATION: nucleotide sequence of mRNA variant of Wnt4

<400> SEQUENCE: 1

```
atgagtcccc gctcgtgcct gcgttcgctg cgcctcctcg tcttcgccgt cttctcagcc      60
gccggagcaa ctggctgtac ctggccaagc tgtcgtcggt ggggagcatc tcagaggagg     120
agacgtgcga gaaactcaag ggcctgatcc agaggcaggt gcagatgtgc aagcggaacc     180
tggaagtcat ggactcggtg cgccgcggtg cccagctggc cattgaggag tgccagtacc     240
agttccggaa ccggcgctgg aactgctcca cactcgactc cttgcccgtc ttcggcaagg     300
tggtgacgca agggactcgg gaggcggcct tcgtgtacgc catctcttcg gcaggtgtgg     360
cctttgcagt gacgcgggcg tgcagcagtg gggagctgga gaagtgcggc tgtgacagga     420
cagtgcatgg ggtcagccca cagggcttcc agtggtcagg atgctctgac aacatcgcct     480
acggtgtggc cttctcacag tcgtttgtgg atgtgcggga gagaagcaag ggggcctcgt     540
ccagcagagc cctcatgaac ctccacaaca atgaggccgg caggaaggcc atcctgacac     600
acatgcgggt ggaatgcaag tgccacgggg tgtcaggctc ctgtgaggta aagacgtgct     660
ggcgagccgt gccgcccttc cgccaggtgg gtcacgcact gaaggagaag tttgatggtg     720
ccactgaggt ggagccacgc cgcgtgggct cctccagggc actggtgcca cgcaacgcac     780
agttcaagcc gcacacagat gaggacctgg tgtacttgga gcctagcccc gacttctgtg     840
agcaggacat gcgcagcggc gtgctgggca cgaggggcca cacatgcaac aagacgtcca     900
aggccatcga cggctgtgag ctgctgtgct gtggccgcgg cttccacacg cgcaggtgg     960 agctggctga acgctgcagc tgcaaattcc actggtgctg cttcgtcaag tgccggcagt    1020
gccagcggct cgtggagttg cacacgtgcc gatga                                 1055
```

<210> SEQ ID NO 2
<211> LENGTH: 738
<212> TYPE: DNA
<213> ORGANISM: Artificial Sequence

```
<220> FEATURE:
<223> OTHER INFORMATION: nucleotide sequence of mRNA variant of YWHAZ

<400> SEQUENCE: 2
atggataaaa atgagctggt tcagaaggcc aaactggccg agcaggctga gcgatatgat      60
gacatggcag cctgcatgaa gtctgtaact gagcaaggag ctgaattatc caatgaggag     120
aggaatcttc tctcagttgc ttataaaaat gttgtaggag cccgtaggtc atcttggagg     180
gtcgtctcaa gtattgaaca aaagacgaa ggtgctgaga aaaaacagca gatggctcga      240
gaatacagag agaaaattga gacggagcta agagatatct gcaatgatgt actgtctctt     300
ttggaaaagt tcttgatccc caatgcttca caagcagaga gcaaagtctt ctatttgaaa     360 atgaaggag attactaccg ttacttggct gaggttgccg ctggtgatga caagaaaggg      420
attgtcgatc agtcacaaca agcataccaa gaagcttttg aaatcagcaa aaaggaaatg     480
caaccaacac atcctatcag actgggtctg gcccttaact tctctgtgtt ctattatgag     540
attctgaact ccccagagaa agcctgctct cttgcaaaga cagcttttga tgaagccatt     600
gctgaacttg atacattaag tgaagagtca tacaaagaca gcacgctaat aatgcaatta     660
ctgagagaca acttgacatt gtggacatcg gatacccaag gagacgaagc tgaagcagga     720
gaaggagggg aaaattaa                                                    738
```